United States Patent [19]

Wilms

[11] 4,225,231

[45] Sep. 30, 1980

[54] APPARATUS FOR MEASURING THE RADII OF CONTACT LENSES

[75] Inventor: Karl-Heinz Wilms, Emmering, Fed. Rep. of Germany

[73] Assignee: Optische Werke G. Rodenstock, Fed. Rep. of Germany

[21] Appl. No.: 29,030

[22] Filed: Apr. 11, 1979

[30] Foreign Application Priority Data

Apr. 20, 1978 [DE] Fed. Rep. of Germany ....... 2817327

[51] Int. Cl.² .............................................. G01B 9/00
[52] U.S. Cl. .................................................. 356/127
[58] Field of Search ................ 356/124, 125, 126, 127

[56] References Cited

U.S. PATENT DOCUMENTS

| | | | |
|---|---|---|---|
| 3,019,708 | 2/1962 | French et al. ....................... | 356/126 |
| 3,027,804 | 4/1962 | Wesley et al. ...................... | 356/124 |
| 3,540,828 | 11/1970 | Nupuf .................................. | 356/127 |

Primary Examiner—John K. Corbin
Assistant Examiner—R. A. Rosenberger
Attorney, Agent, or Firm—Craig and Antonelli

[57] ABSTRACT

An apparatus for measuring the radii of contact lenses includes a holding arrangement for mounting a contact lens to be measured, and a mirror arrangement for directing a measuring beam emitted from an optical radius-measuring device to the contact lens to be measured. The optical radius-measuring device has an optical axis which is located at different height positions during measurement of the contact lens and the mirror arrangement is movable so that the optical axis of the radius-measuring device passes through the area of the center of curvature of the contact lens surface to be measured.

9 Claims, 3 Drawing Figures

APPARATUS FOR MEASURING THE RADII OF CONTACT LENSES

The present invention relates to apparatus for measuring the radii of contact lenses.

For the perfect fitting of contact lenses, it is necessary to be able to measure the curvature of the concave side of the lens out to the marginal area, as well as in various intersecting directions. It should be possible for the individual fitting the lenses to perform the measurements with a conventional optical radius-measuring device such as an ophthalmometer.

Apparatus which can be fitted to an ophthalmometer is known for example, from German Offenlegungsschrift No. 22 02 560, wherein the contact lenses are held in a holder, the holder being rotatable about its axis and swivelable about a horizontal axis so as to enable measurement of the curved surfaces of the contact lenses out to the marginal area thereof. The lenses are measurable by the ophthalmometer using a fixed mirror tilted at 45°. In such device, however, errors occur during measurement of soft contact lenses which can change their shape as a result of swivelling.

It is therefore an object of the present invention to provide an apparatus for measuring the radii of contact lenses, wherein precise measurement of the concave lens surfaces is possible with the aid of a conventional optical radius measuring device or ophthalmometer without the lenses leaving the horizontal position.

It is another object of the present invention to provide an apparatus which enables the precise measurement of the concave surfaces of soft contact lenses with the aid of a conventional optical radius-measuring device.

In accordance with the present invention, the apparatus for measuring the radii of contact lenses includes a member for mounting the contact lens for rotational movement as well as to adjust the height or vertical position thereof and a mirror for directing the measuring beam emitted by an optical radius-measuring device to the contact lens to be measured with the mirror being movable along a curve in such a manner that the optical axis of the radius-measuring device which is located at different heights during the measurement always passes through the area of the center of curvature of the contact lens surface to be measured.

In the apparatus according to the present invention, the contact lens to be measured remains in its horizontal position, merely being rotated about the vertical optical axis of the lens, which coincides during measurement with the rotational axis of the holder. The changes in the entire radius measuring device which complicate measurement and contribute to measurement errors, for example, the focusing of the measuring device toward the contact lens holder, is made unnecessary in accordance with the present invention, since only the mirror, which directs the measuring beam onto the lens, is moved over a relatively short distance along a curved guide or around a horizontal swivel axis. Thus, only a height adjustment of the optical radius-measuring device, with the aid of the fine height adjustment provided therefore is necessary in order to follow the movement of the mirror.

According to a feature of the present invention, the contact lens, during the measurement thereof can be held in such a way that it floats and is subject to zero stress, without the lens being deformed by the swivelling of the holder.

These and further objects, features and advantages of the present invention will become more obvious from the following description when taken in connection with the accompanying drawings wherein.

Figure 1:
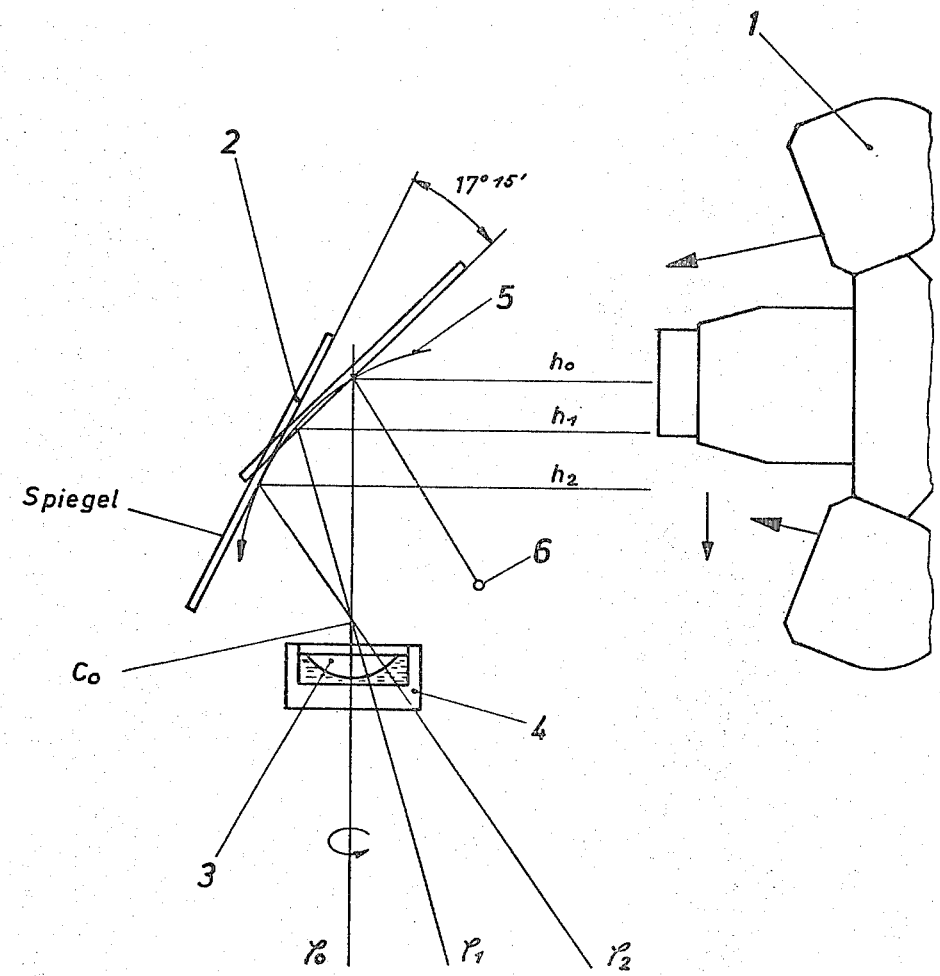
FIG. 1 is a schematic side view of the entire device, in accordance with the present invention.

Referring now to the drawings, wherein like references are utilized to designate like parts, there is shown an optical radius-measuring device or opthalmometer 1 providing a measuring beam which is directed onto a contact lens 3 by a movable mirror 2, the lens floating in a lens holder 4. In order to measure the marginal areas of the contact lens 3, the mirror 2 is tangentially movable along curve 5, which is essentially parabolic and extending along a vertical plane. The curve 5 may be an arc with a midpoint 6 located approximately on a curve corresponding to the exact geometric conditions such that the curve described by the mirror as it moves is an approximately circular arc.

In order to permit the measuring beam to pass practically through the center of curvature $C_0$ of the contact lens while the lens 3 remains in a fixed position for various measuring directions, the opthalmometer 1 is displaceable heightwise. The height $h_0$ of the optical axis of the ophthalmometer is used for measurements in the vertical direction corresponding to the angle $\phi_0$, whereas other height positions $h_1$ and $h_2$ correspond to measurement angles $\phi_1$ and $\phi_2$, as illustrated in FIG. 1.

Figure 2:
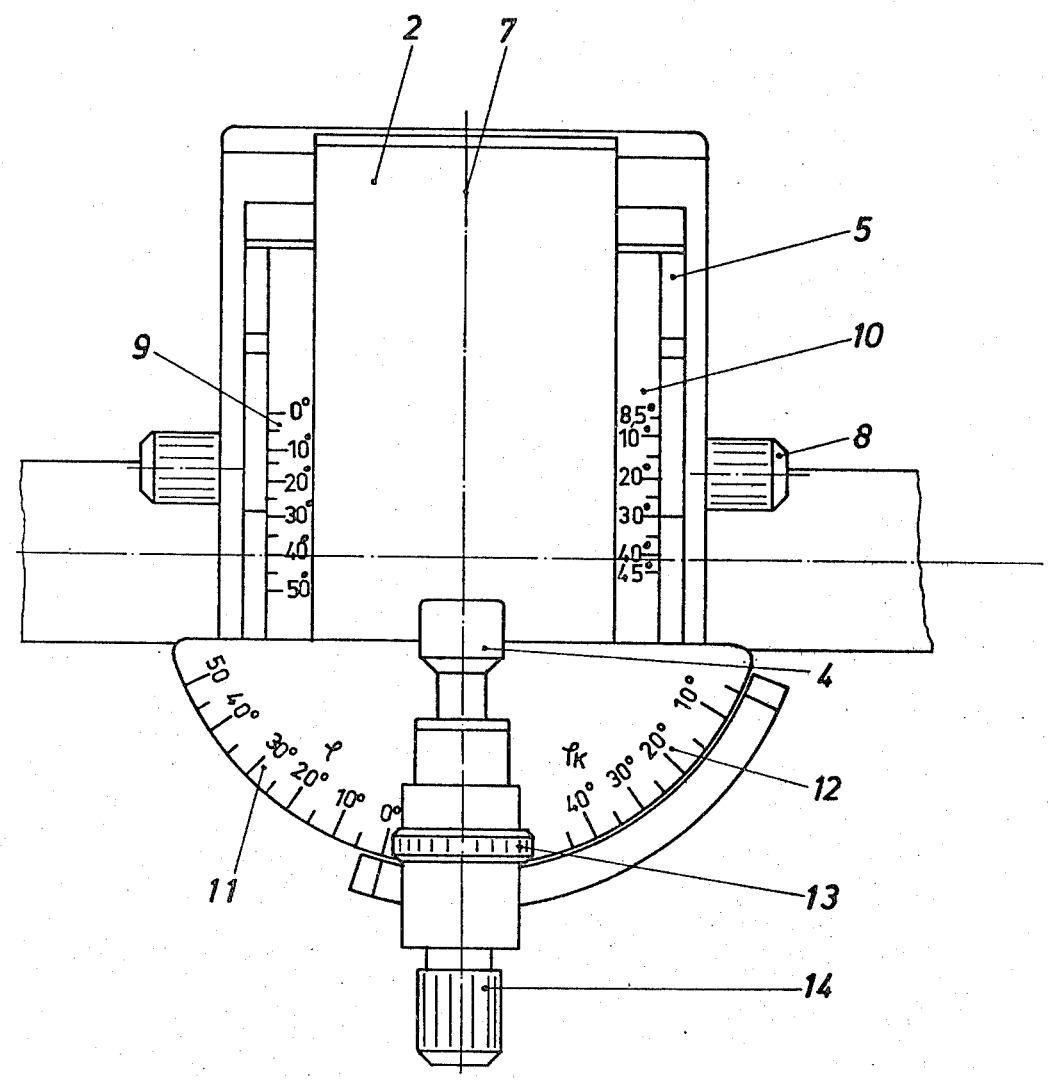
FIG. 2 shows the movable mirror and lens holder as viewed from the optical radius-measuring device.

In FIG. 2, the mirror 2 is shown as it would appear from the ophthalmometer. The holder 4 is rotatable about vertical axis 7. The mirror 2 is displaceable along the curve 5 as delimited by a curved guides with the aid of knobs 8. A scale 9 is provided with angular divisions for superimposed measurement marks indicating positions of the mirror and a scale 10 is used for adjustment with adjacent measurement marks. The scales 11 and 12 are only utilized for conventional measurement of hard contact lenses, not held in a floating position, and indicate the positions of the holder when swivelled about a horizontal axis. The holder 4 is adjustable heightwise in the usual manner with the aid of an adjusting ring 13 while knob 14 is utilized to rotate the holder 4 about its vertical axis.

Figure 3:
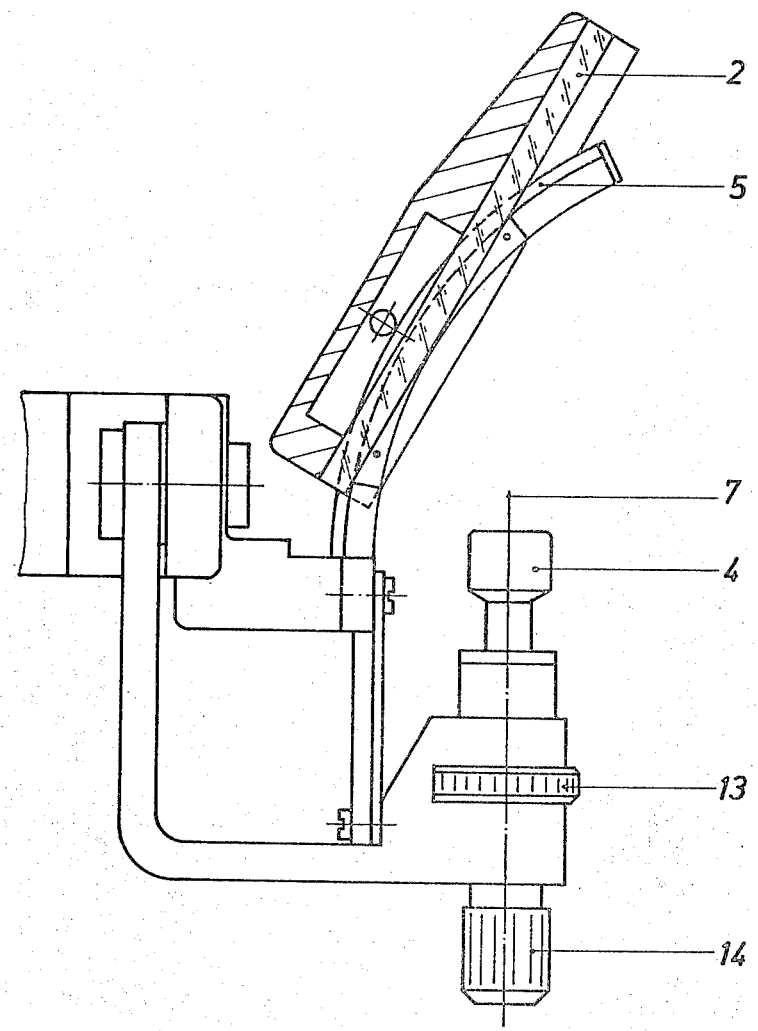
FIG. 3 is a side view of FIG. 2 with a cross section through the mirror.

FIG. 3 is a side view of FIG. 2, wherein the mirror 2 has been sectioned vertically and the curved guide path is more clearly illustrated. As is apparent, the mirror 2 may be swivable about a horizontal axis so as to direct the measuring beam onto the contact lens.

Since the contact lens and particularly, a soft contact lens, is mounted to be floated in the holder and is subject to zero stress without the lens being deformed by swivelling of the holder, precise measurement of the curvature of the concave side of the soft contact lense out to the marginal area thereof as well as in various intersecting directions can be achieved with the apparatus of the present invention.

It is understood that the present invention is not limited to the apparatus described herein, but is susceptible of numerous changes and modifications as known to those skilled in the art, and I therefore do not wish to be limited to the details shown and described herein but intend to cover all such changes and modifications as are encompassed by the scope of the appended claims.

I claim:

1. Apparatus for measuring the radii of contact lenses comprising means for mounting a contact lens to be measured, and mirror means for directing a measuring beam emitted from an optical radius-measuring means to the contact lens to be measured, the optical radius-measuring means having an optical axis which is located at different height positions during measurement of the contact lens, the mirror means being movable so that the optical axis of the radius-measuring means passes through the area of the center of curvature of the contact lens surface to be measured.

2. Apparatus according to claim 1, wherein the mirror means is movable along a curved path, the curved path being substantially parabolic and extending along a vertical plane.

3. Apparatus according to claim 1, wherein the path of movement described by the mirror means during movement thereof is an approximately circular arc.

4. Apparatus according to claim 1, further comprising curved guide means for mounting the mirror means and enabling movement thereof along a curved path.

5. Apparatus according to claim 1, further comprising means for mounting the mirror means for enabling swivelling movement about a horizontal axis.

6. Apparatus according to any one of claims 1, 2, 3, 4 or 5, wherein the contact lens mounting means enables rotational movement of the contact lens about a vertical axis and height adjustment in the vertical direction.

7. Apparatus according to claim 6, wherein the contact lens is a soft contact lens and the contact lens mounting means enables floating of the soft contact lens.

8. Apparatus according to claim 7, wherein the mounting means maintains the soft contact lens in a horizontal position during measurement so as to enable precise measurement of the curvature of the concave side of the soft contact lens out to the marginal area thereof and in different intersecting directions.

9. Apparatus according to claim 8, wherein the optical radius-measuring means is an opthalmometer.

* * * * *